(12) United States Patent
Robinson

(10) Patent No.: US 7,852,572 B2
(45) Date of Patent: Dec. 14, 2010

(54) COMPACT SUPER WIDE-ANGLE IMAGING SYSTEM

(75) Inventor: M. Dirk Robinson, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 323 days.

(21) Appl. No.: 11/768,009

(22) Filed: Jun. 25, 2007

(65) Prior Publication Data
US 2008/0316609 A1 Dec. 25, 2008

(51) Int. Cl.
*G02B 13/04* (2006.01)
*G02B 9/60* (2006.01)

(52) U.S. Cl. ........................ 359/753; 359/770

(58) Field of Classification Search .......... 359/691, 359/714, 717, 753, 770, 649, 664
See application file for complete search history.

(56) References Cited

U.S. PATENT DOCUMENTS

| | | | |
|---|---|---|---|
| 4,525,038 A | 6/1985 | Müller | |
| 6,674,473 B1 * | 1/2004 | Takada | 359/689 |
| 6,844,991 B2 | 1/2005 | Mizuguchi | |
| 7,023,628 B1 | 4/2006 | Ning | |
| 7,173,776 B2 | 2/2007 | Tada et al. | |
| 7,283,312 B2 * | 10/2007 | Kawada | 359/725 |
| 2006/0274433 A1 | 12/2006 | Kamo | |
| 2006/0285002 A1 | 12/2006 | Robinson et al. | |
| 2007/0002158 A1 | 1/2007 | Robinson | |
| 2007/0268375 A1 * | 11/2007 | Robinson et al. | 348/222.1 |

OTHER PUBLICATIONS

Fales, C.L. et al., "Imaging System Design for Improved Information Capacity," Applied Optics, Mar. 15, 1984, pp. 872-888, vol. 23, No. 6.

* cited by examiner

*Primary Examiner*—Alicia M Harrington
(74) *Attorney, Agent, or Firm*—Fenwick & West LLP

(57) ABSTRACT

A super wide-angle imaging system has a short total track length. The lens system is a retrofocus type lens system that uses only a few lenses with no cemented lens elements. Acceptable performance is achieved by taking advantage of subsequent digital image processing. The compact lens system is designed to create optical images that can be restored by subsequent digital processing that compensates for otherwise unacceptable aberrations introduced by the lens system.

24 Claims, 13 Drawing Sheets

Figure 1 (prior art)

COMPACT SUPER WIDE-ANGLE IMAGING SYSTEM

BACKGROUND OF THE INVENTION

1. Field of the Invention

This invention relates generally to wide angle optical imaging systems, including such systems that are suitable for use on motor vehicles.

2. Description of the Related Art

Manufacturers of motor vehicles are increasingly equipping their vehicles with imaging systems. For example, manufacturers are installing imaging systems at the rear of the vehicle to assist drivers when the vehicle is backing up. To increase the visibility for drivers and potentially eliminate blind spots altogether, these imaging systems preferably have a very wide field of view. Fields of view between 160-200 degrees (at least along the horizontal direction) are desirable to fully capture the scene at the rear of a vehicle. In addition to rear-looking systems, vehicular mounted imaging systems can also be used for other purposes, for example to detect lane markers or other guidance markings, to allow the driver to view directions other than rear-looking and possibly even to view the driver, the passengers or other interior areas of the vehicle.

Regardless of the application, it is usually desirable for the wide-angle vehicular-mounted wide angle lens system to be easy to manufacture, have a fast F# (i.e., low numerical aperture), and have a short total track length (i.e., the physical distance from the lens surface closest to the object to the image plane). Previous designs for optical systems have satisfied some of these requirements, but not all of them. Some designs require only a few easy-to-manufacture lens elements, but require long total track lengths. Others shorten the total track length but require many lens elements and often suffer from illumination fall-off or severe distortion. Examples of wide angle optical systems are described in U.S. Pat. Nos. 4,525,038, 6,844,991, 7,023,628, 7,173,776, and U.S. Patent Publ. No. 2006/0274433A1.

Thus, there is a need for a high quality wide angle imaging system, where the wide angle optical system has a short total track length, a fast F#, and only a few lens elements, preferably without any cemented lens elements.

SUMMARY OF THE INVENTION

The present invention overcomes the limitations of the prior art by providing a super wide-angle imaging system with short total track length. The optical portion of the imaging system is a retrofocus type lens system having a first lens group with negative power followed by a second lens group with positive power in order from the object to the image plane. The first negative lens group acts both to bend the wide field angles into smaller field angles as well as to extend the back focal distance while preserving a small effective focal length. The second positive lens group acts to correct optical aberrations and direct the flux onto the photodetector array at the image plane.

A short total track length using only a few lens elements is achieved by taking advantage of subsequent digital image processing. The optical image formed at the image plane is captured by a sensor array, thus creating digital images. The imaging system includes subsequent digital processing to compensate for otherwise unacceptable aberrations introduced by the compact optical system. This approach can yield short lens designs with only a few lenses and without any cemented lens elements.

In one design, the lens system has five lenses: two spherical lenses in the first lens group, and three lenses in the second lens group with typically at least one asphere. In an example design, the optical system has a focal length of f=0.8 mm with a 190 degree field-of-view. The lens is an F/2.8 lens with a maximum field height of 1.71 mm, corresponding to a ⅕ inch VGA resolution image sensor having 4.25 μm pixels. The system is designed for three-color operation over the spectral range of 425-700 nm, using a standard Bayer pattern for the color filters. An optical system with a total track length (from front of first lens to image plane) of not more than 15 mm is capable of achieving acceptable performance after digital filtering of the captured images.

In a second design, the lens system has four lenses: two spherical lenses in the first lens group and two lenses (usually, both aspheric) in the second lens group. This lens system can be designed to illustrate similar principles of performance as the first example.

In one approach, the lens system contains strong spherical aberration, which is permitted so that the compact optical system can compensate for other aberrations. Specifically, the axial defocus aberration is reduced by the strong spherical aberration, which prevents zero-crossings in the modulation transfer function (MTF) typical to axial defocus aberration. The MTF may degrade relative to the diffraction-limited case as a result. However, in one aspect, the MTF does not fall below approximately 10% contrast for the relevant spatial frequencies, thus allowing linear digital filtering to restore the contrast.

Other aspects of the invention include systems that incorporate the imaging systems described above, applications for these systems and methods corresponding to all of the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 1 (prior art) is a top view of the Bayer color filter array pattern used in color photodetectors.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Chromatic Aberration and Image Processing

One predominant aberration in wide-angle imaging systems is lateral chromatic aberration. The steep bending angles involved in the wide-angle system produces a radial separation of the different color light rays at the image plane. Most traditional wide-angle lens designs have long total track lengths and incorporate cemented lens elements to minimize these effects of lateral chromatic aberration. In one aspect of the invention, however, the requirement that lateral chromatic aberration be largely corrected or even eliminated completely is significantly relaxed.

Figure 1:
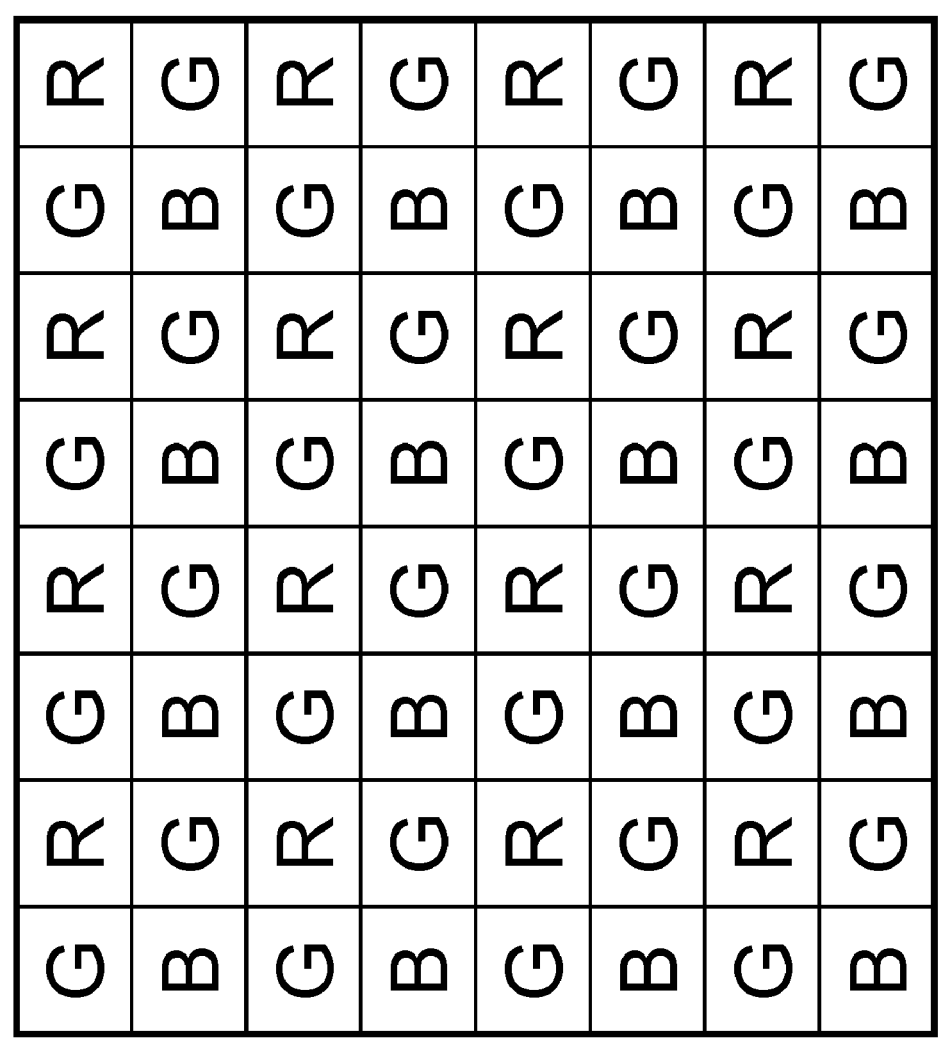
Figure 2:
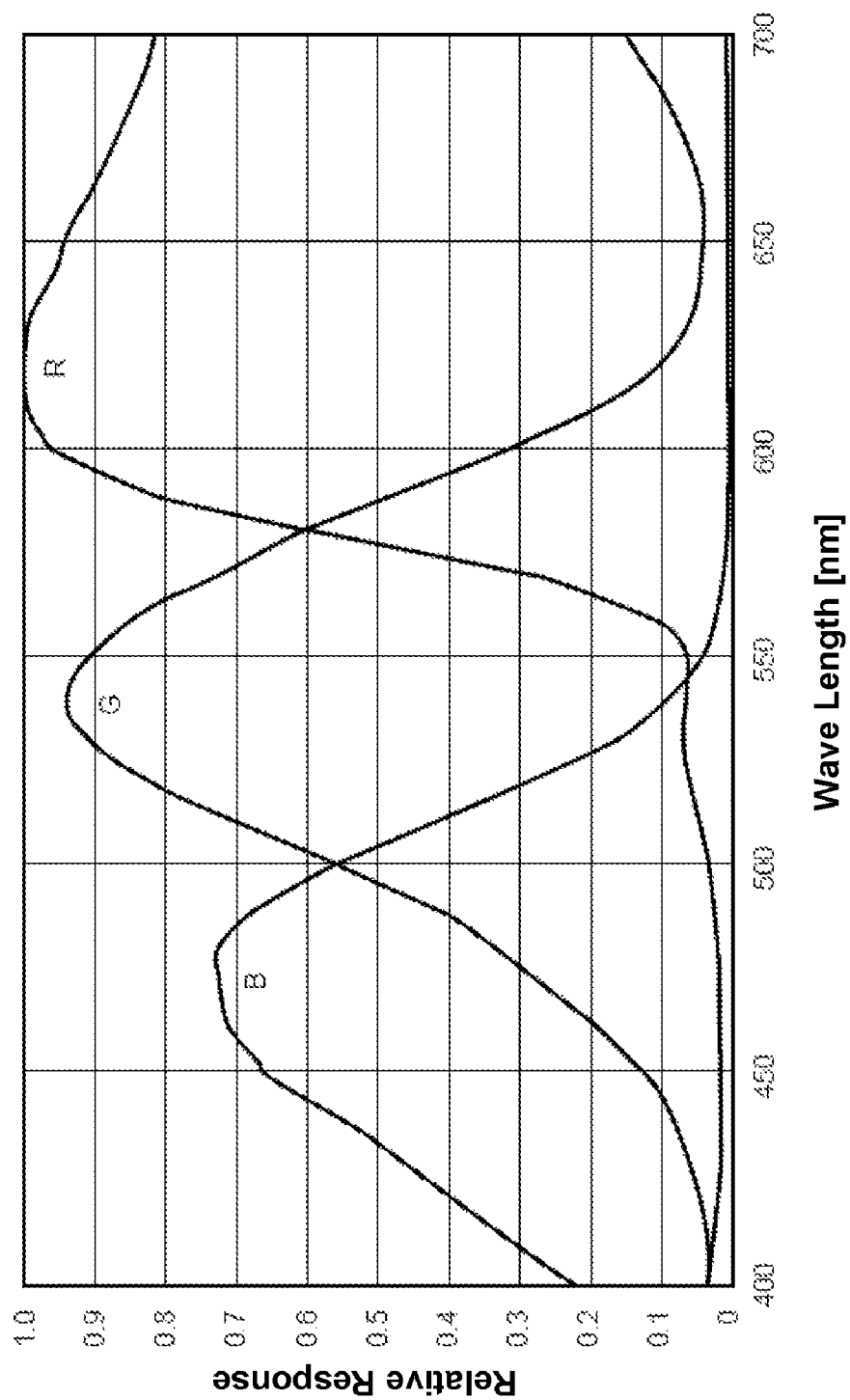
FIG. 2 (prior art) is an example of the spectral sensitivity of a RGB CCD sensor.

Typical photodetector arrays utilize color filter arrays (CFA) to multiplex the sampling of different color channels. The most common CFA is known as the Bayer pattern. An example of the Bayer pattern is shown in FIG. 1. Each of the three color channels in the CFA has different spectral filters so that each pixel captures only a single region in the color space. The letters R, G and B in FIG. 1 indicate color filters for the red, green and blue channels, respectively. FIG. 2 shows the spectral sensitivity of a Sony ICX285AQ CCD image sensor. Since the CFA essentially lowers the sampling rate for an individual color channel (e.g., the spacing from one green pixel to the next green pixel is twice the spacing from one pixel to the next pixel), the requirement on lateral chromatic aberration can be relaxed, particularly if subsequent digital processing is employed. In one approach, the requirement for the lateral chromatic aberration is that it must fall within the separation of two pixels of the same color (assuming that adjacent pixels for a color channel are spaced two pixels apart).

Furthermore, each color channel captures only a portion of the overall spectrum. Therefore, the chromatic aberration need be corrected only over the spectral range of each individual color channel and not simultaneously over the entire spectrum of the overall imaging system. For example, if the sensor has 4.5 μm pixels (i.e., pixels spaced on a 4.5 μm pitch) and the standard Bayer pattern is used, then the green channel will have a 9 μm effective pitch. Assume that the green channel covers the spectrum from 500-600 nm in wavelength (defined by 50 percent spectral sensitivity lines). Then the constraint on lateral chromatic aberration can be relaxed to a 9 μm spread across the 500-600 nm spectral range. Lateral chromatic spreads below this level will fall within the pixel sampling rate. This is a significantly relaxed requirement compared, for example, to a requirement of 4.5 μm spread across the entire visible spectral range (red, green and blue channels). Furthermore, it can often be correctly assumed that the digital processing will significantly sharpen the color channels blurred due to lateral chromatic aberration. In many cases, the lateral chromatic aberration constraint may be relaxed even further to about 3.5 times the pixel pitch. These relaxed requirements can eliminate the need for cemented lens elements and allow even more compact lens systems.

In addition, most imaging systems contain an image processing subsystem. These subsystems can also be used to relax the design requirements on the optical lens system. For example, the wide-angle lens system is a retrofocus type optical system. As such, the effective focal length is smaller than the back focal length of the optical system. Because of this, the axial chromatic aberration is less of an issue than with a non-retrofocus type optical system. This effect can be used to eliminate cemented lens elements that are typically used to counter axial chromatic aberration. Instead, the lens design is allowed to have considerable spherical and coma aberrations. These aberrations lower optical contrast (MTF) but not in such a way that the contrast cannot be restored via digital processing. The reduced contrast can be restored using linear sharpening filters, as will be illustrated below. In this way, the requirements on the optical system can be relaxed, with the resulting contrast loss compensated by image processing. U.S. patent application Ser. No. 11/155,870, "End to end design of electro-optic imaging systems," filed Jun. 17, 2005 by Robinson and Stork and Ser. No. 11/332,640, "End to end design of electro-optic imaging systems with constrained digital filters," filed Jan. 13, 2006 by Robinson, which are all incorporated by reference in their entirety, describe this design approach in further detail. The result is shorter total track lengths, faster F#, with only a few lenses.

Example One Design

Figure 3:
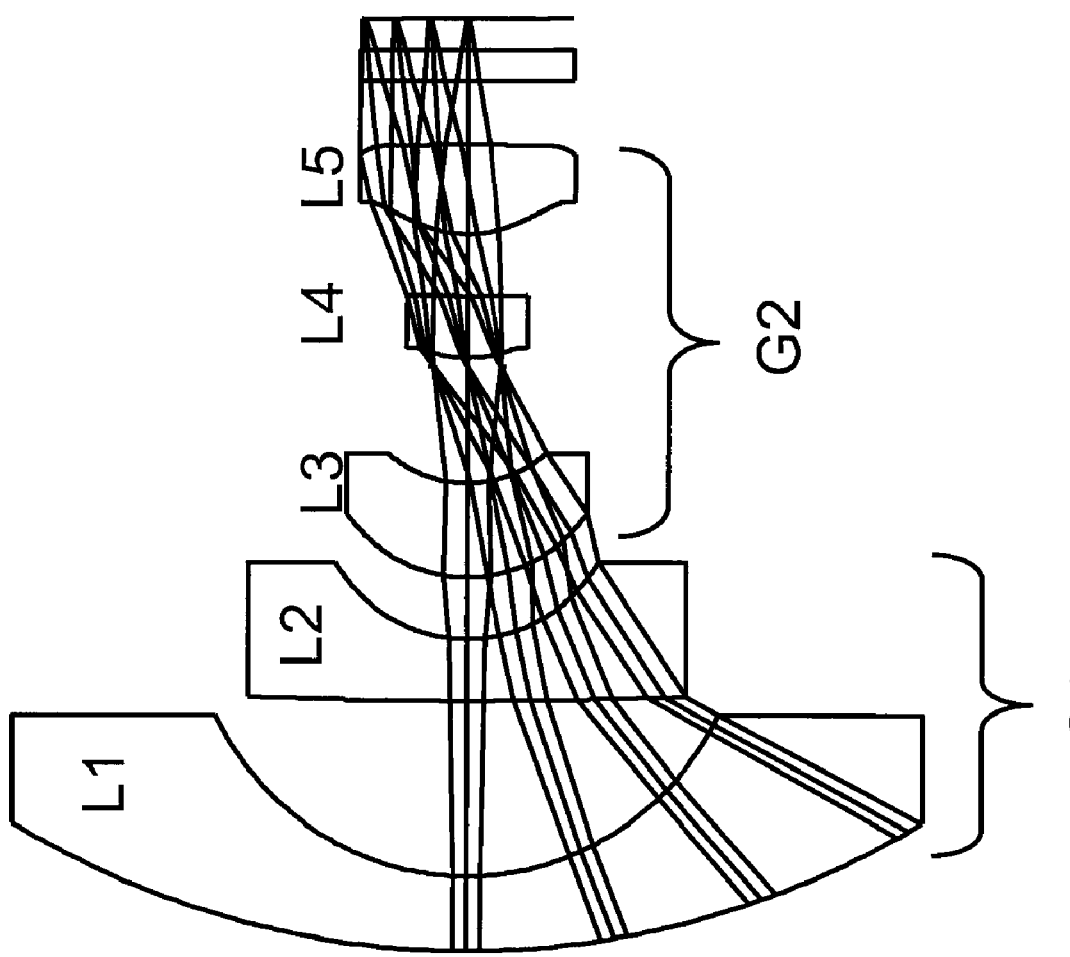
FIG. 3 shows a compact five-lens optical system according to the invention.

FIG. 3 shows a compact five-lens optical system according to the invention. The lens design has a focal length of f=0.8 mm with a 190 degree field-of-view. The lens is an F/2.8 lens with a maximum field height of 1.71 mm, corresponding to a ⅐ inch VGA resolution image sensor having 4.25 μm pixels. The system is designed for three-color operation over the spectral range of 425-700 nm, using a standard Bayer pattern for the color filters.

The optical prescription for the lens design is shown in Table 1. The fourth and fifth lenses are aspheres. The aspheric terms are defined by the conic constant k and the rotationally symmetric higher order even polynomial terms. The aspheric surface is defined by the rotationally symmetric surface with surface sag $S(\rho)$ as a function of radial distance $\rho$ defined by $$S(\rho) = \frac{\frac{\rho^2}{R}}{1 + \sqrt{1-(1+k)\frac{\rho^2}{R^2}}} + c_4 p^4 + c_6 p^6 + c_8 p^8 + c_{10} p^{10} \quad (1)$$

where R is the radius of curvature of the surface. Table 1 also gives the values for the aspheric terms.

TABLE 1

Example Five-Lens Design

| Surface | Radius (mm) | Thickness (mm) | Nd | Vd |
|---|---|---|---|---|
| 1 | 13.602 | 1.2 | 1.7 | 53.9 |
| 2 | 4.215 | 2.75 | | |
| 3 | 313.704 | 1.0 | 1.64 | 60.1 |
| 4 | 2.342 | 1.0 | | |
| 5 | 2.378 | 1.22 | 1.92 | 20.9 |
| 6 | 2.222 | 1.74 | | |
| 7 (stop) | inf | 0.391 | | |
| 8 | 2.021 | .996 | 1.53 | 77 |
| 9 | 6.800 | 1.0 | | |
| 10 | 1.805 | 1.61 | 1.53 | 77 |
| 11 | −1.811 | 1.10 | | |
| 12 | inf | 0.5 | 1.52 | 64.2 |
| 13 | inf | 0.5 | | |

TABLE 1-continued

Example Five-Lens Design

| Surface | Conic (k) | $c_4$ | $c_6$ | $c_8$ | $c_{10}$ |
|---|---|---|---|---|---|
| 8 | −1.68 | | | | |
| 9 | −395 | | | | |
| 10 | −.786 | −3.84E−2 | −4.22E−3 | 9.92E−3 | −3.55E−3 |
| 11 | −7910 | −3.20E−2 | 3.30E−2 | −1.33E−2 | 1.34E−3 |

The maximum lateral color separation between the 500 and 580 nm wavelengths at full field is 10.4 µm. The color separation between 425 and 500 nm is 11 µm. The color separation between 580 and 700 nm is 10.0 µm. These chromatic separations fall generally within the desired range for the targeted pixel size which allows the image processing to restore contrast loss due to chromatic aberration.

Figure 4:
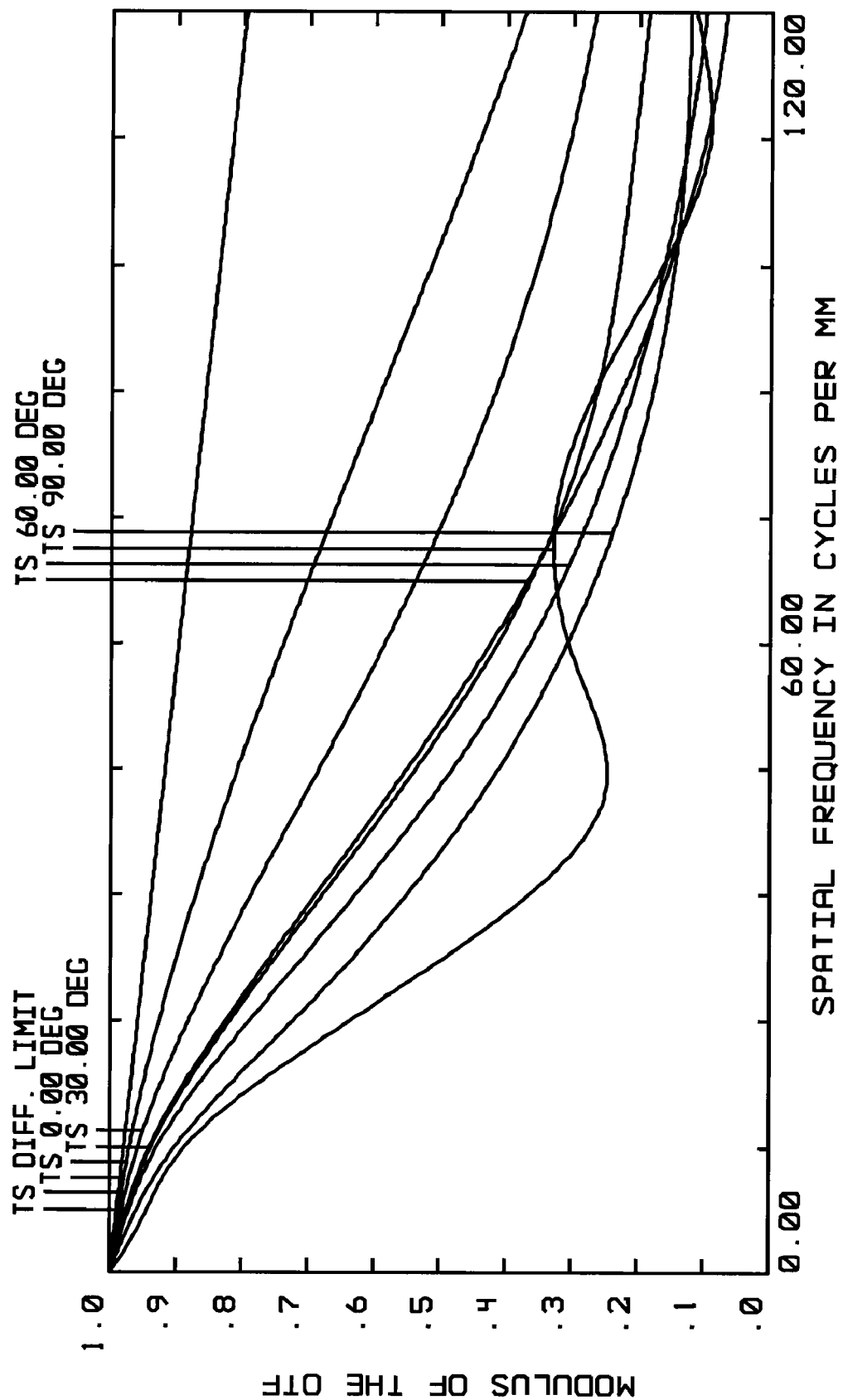
FIGS. 4-6 are MTF curves at 486, 587 and 656 nm wavelengths for the optical system of FIG. 3.
Figure 5:
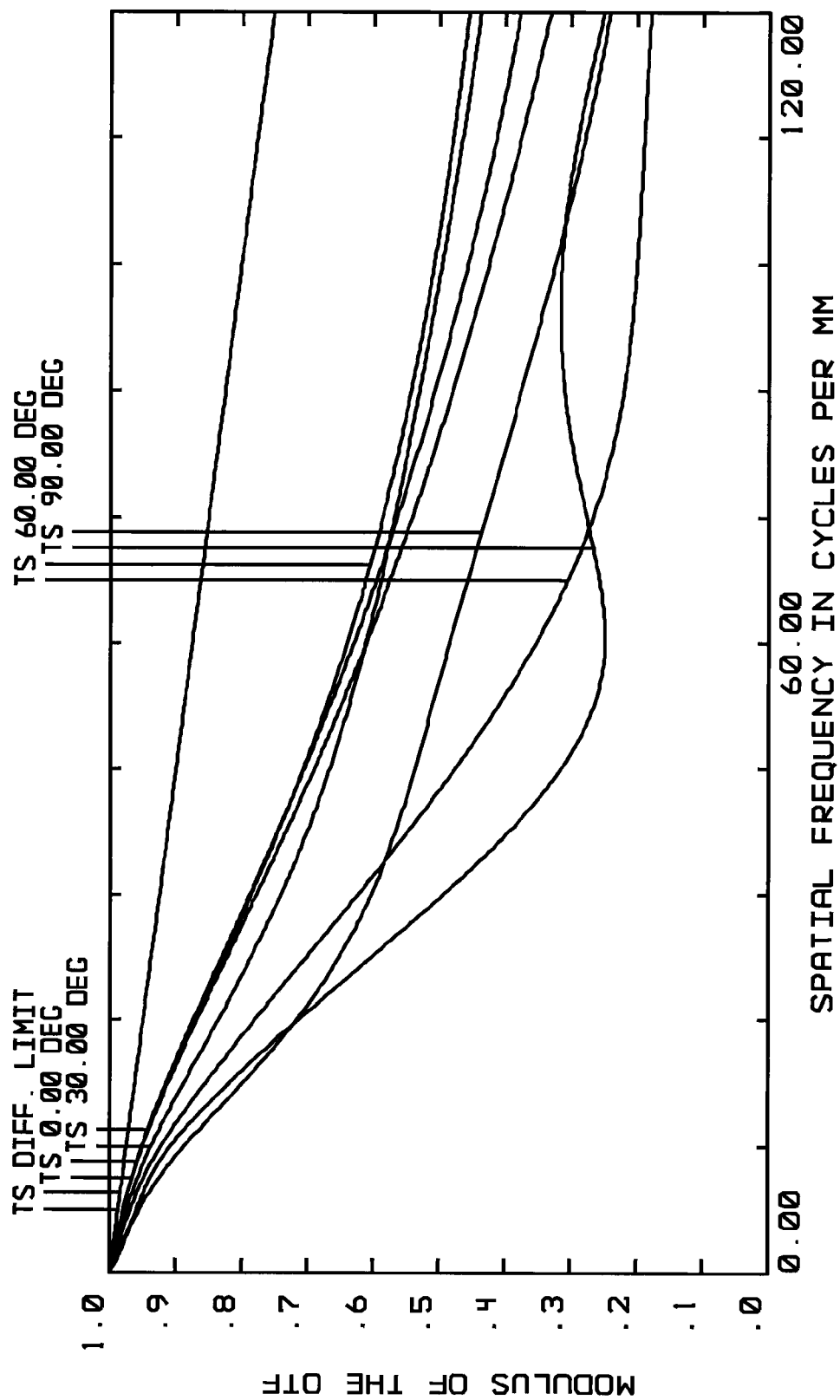
Figure 6:
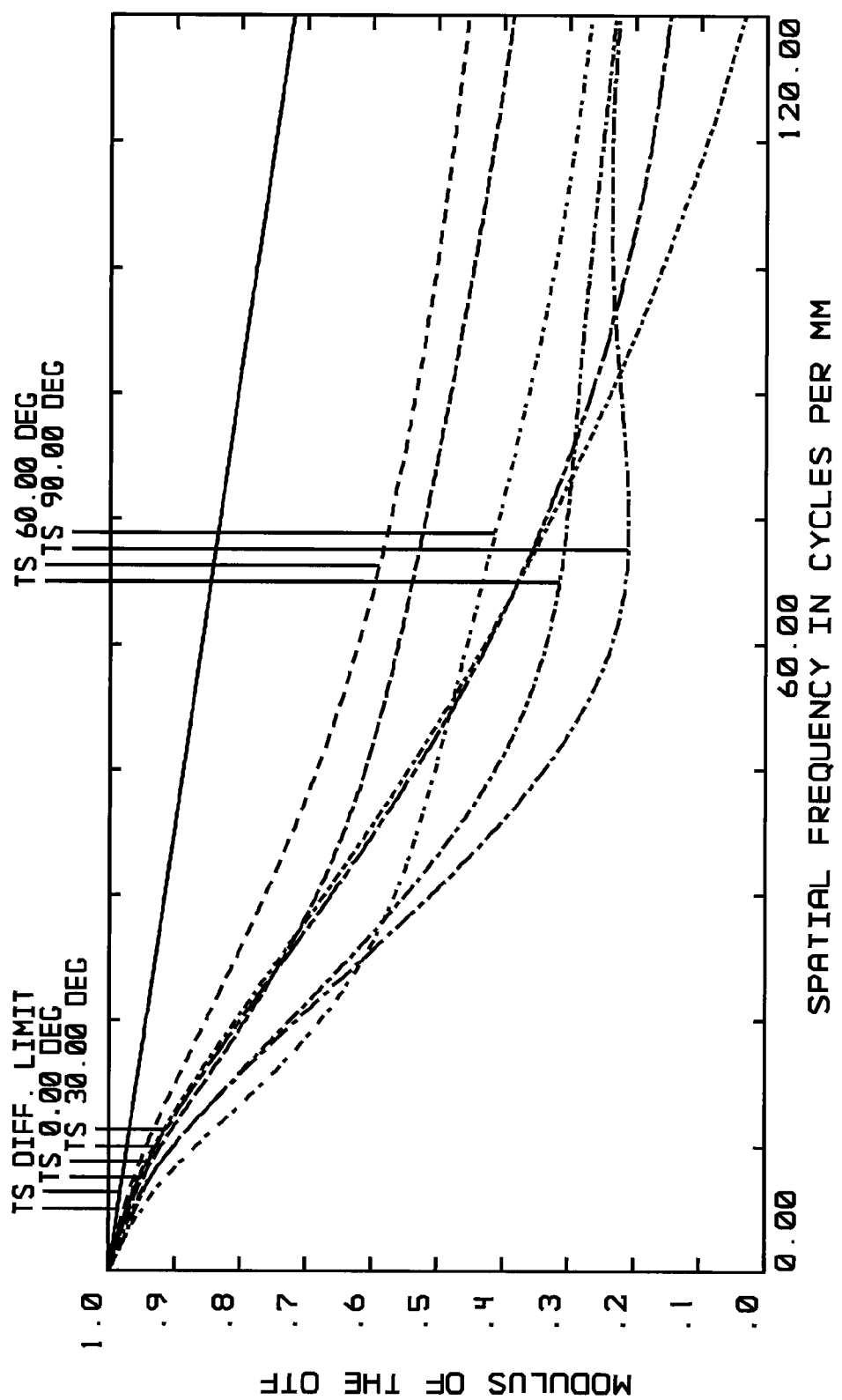

FIGS. 4-6 show the MTF curves for the wavelengths 486, 587, and 656 nm, respectively. In each of these figures, the MTF curves are labelled as "T" for the MTF in the tangential plane and "S" for the MTF in the sagittal plane, where the field angle is given by the number of degrss. The MTF curves certainly are not diffraction-limited. However, they generally do not fall below 10 percent contrast at the sampling rate of 120 cycles/mm for each color channel. Thus, the performance is in the range that can be restored via digital sharpening.

Figure 7:
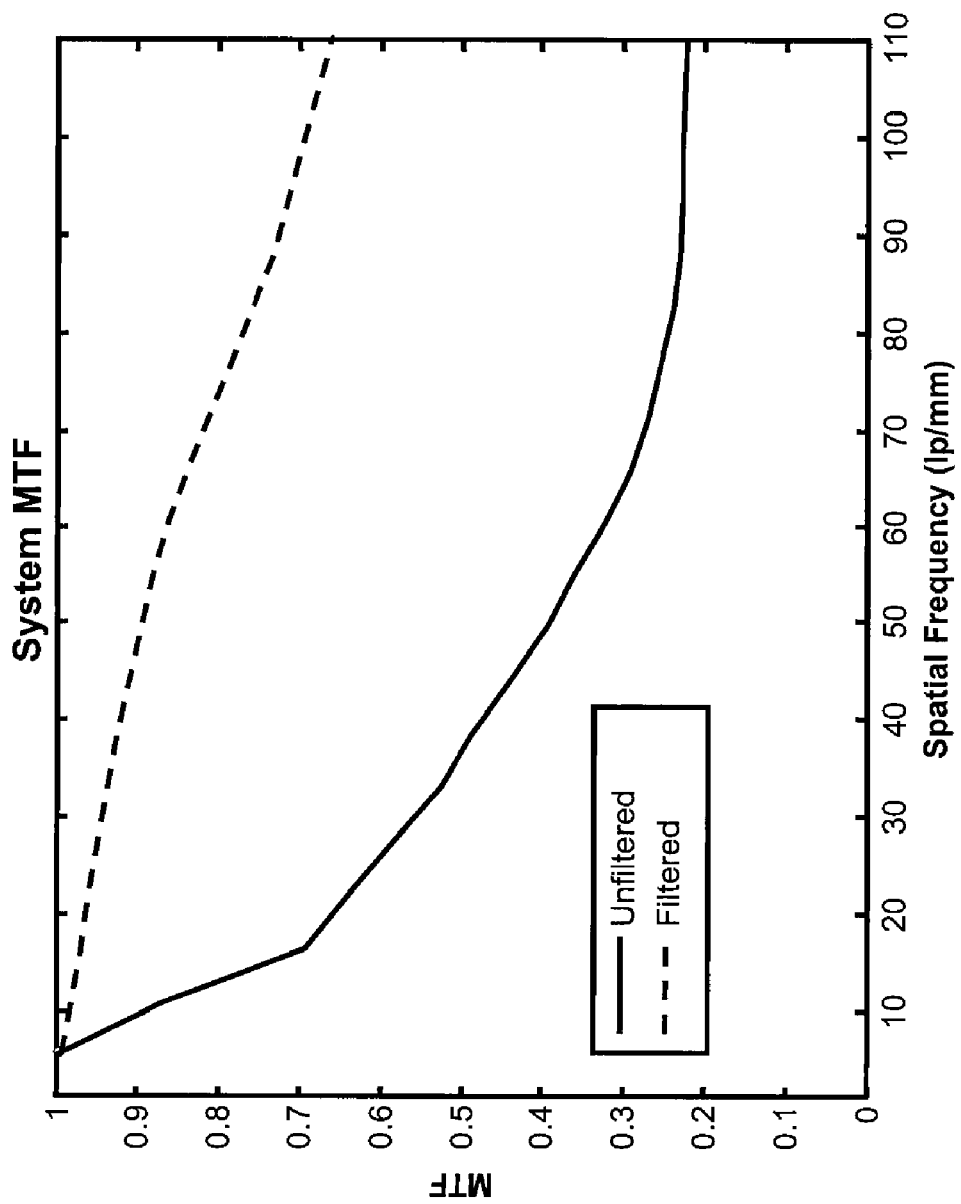
FIG. 7 is the on-axis MTF at 630 nm wavelength before and after digital processing.

FIG. 7 illustrates this. The solid line is the on-axis MTF at 630 nm before digital filtering. The MTF is reduced due to strong spherical aberration, which is permitted so that the compact optical system can compensate for other aberrations. Specifically, the axial defocus aberration is minimized by strong spherical aberration which prevents the zero-crossings typical to axial defocus aberration. The dashed line is the MTF, including linear digital filtering. The digital filter restores the contrast lost due to the strong spherical aberration. In this example, the digital filter was a 9 tap ID filter applied in both the horizontal and vertical directions. The filter tap coefficients were [0.05, −0.09, 0.17, −0.58, 1.90, −0.58, 0.17, −0.09, 0.05]. Other filters such as non-separable filters, non-symmetric filters, etc. may be applied to the image depending on the form of the point spread function.

Figure 8:
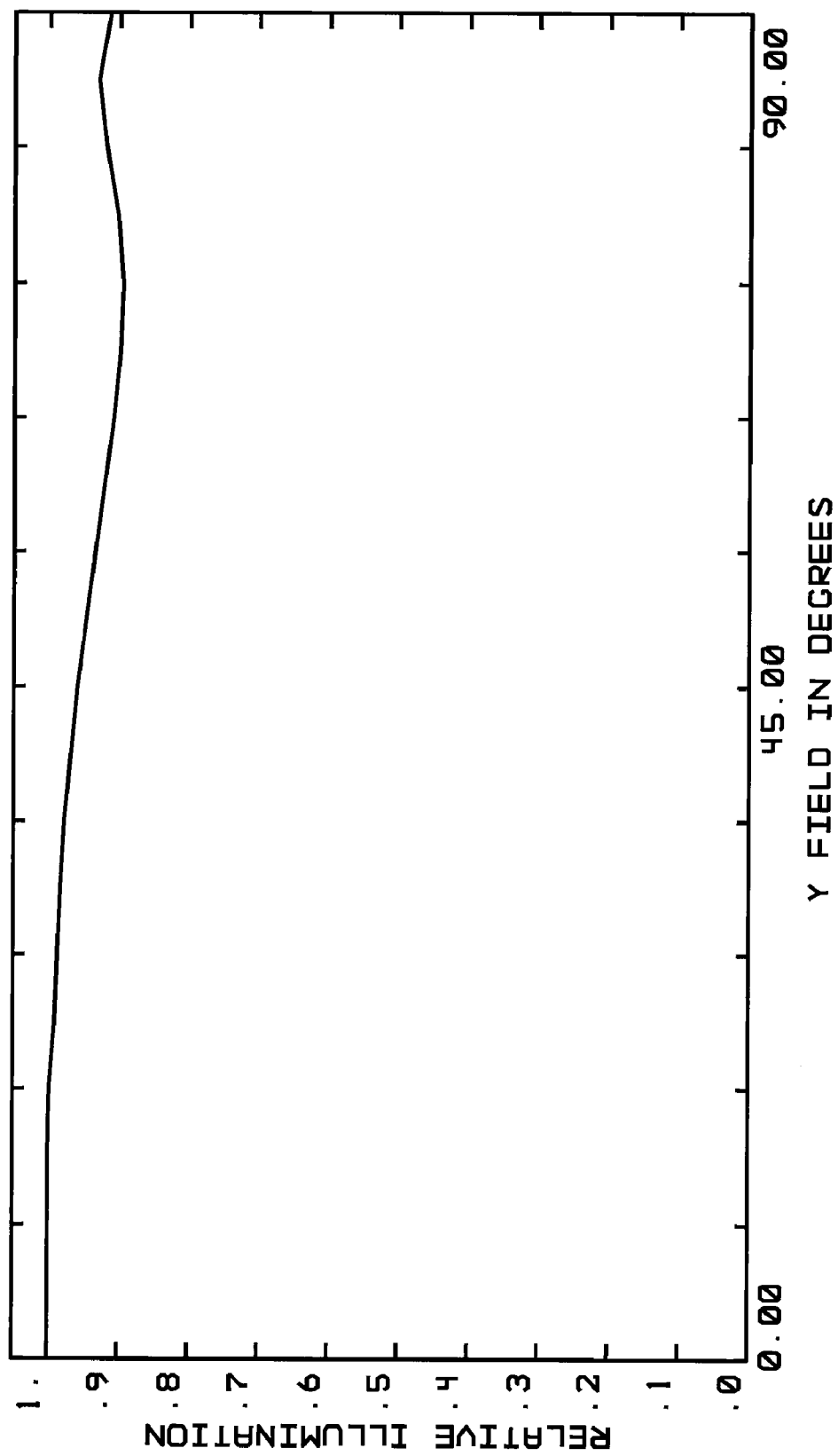
FIG. 8 is a graph of relative illumination over the field of view for the optical system of FIG. 3.

FIG. 8 shows the relative illumination over the field of view, including polarization effects. The lens provides fairly constant illumination over the field of view, which is good for vehicular applications.

Example One Family

The optical system described in FIGS. 3-8 is but one of a family of designs based on similar principles. More generally, lens systems of this sort can be constructed from not more than five lenses without any cemented lens elements. The lens system has two lens groups. The first lens group (G1 in FIG. 3) is a negatively powered lens group. It bends the wide field angles into smaller field angles. The second lens group G2 is the positively powered lens group which acts to focus the light flux onto the photodetector array while balancing the optical aberrations. The second lens group also acts to reduce the lateral chromatic and distortion aberrations. The lens L5 closest to the image plane in the second lens group may have steep angles of incidence for the off-axis rays in order to counter the negative aberrations introduced by the first lens group having strong negative power.

In more detail, the first lens group G1 uses only two negatively powered lenses. The first lens L1 is a meniscus type lens having a convex surface facing the object. The second lens L2 is a negatively powered lens with a concave surface facing the image side. The object facing surface can be either positive or negative. The first lens L1 acts primarily to redirect the wide field angles towards the aperture stop. It allows the lens system to capture light at wide field angles without overly compressing the pupil leading to falloff in relative illumination. The second lens L2 imparts a negative astigmatism aberration to counter the positive astigmatism added by the last element of the second lens group. It also has stronger negative power and increases the divergence of the light flux prior to the aperture stop of the lens system.

The ratio of the focal length $f_1$ of the first lens to the focal length $f_2$ of the second lens preferably falls in the range $$1.2 \leq \left|\frac{f_1}{f_2}\right| \leq 3.8 \tag{2A}$$

or more preferably $$1.5 \leq \left|\frac{f_1}{f_2}\right| \leq 2.2 \tag{2B}$$

In these and the following descriptions, the focal length is defined as the distance from the rear principal plane to the paraxial image surface for an axial target object at infinity. The focal length for an individual lens or for a set of lenses is based on the standard lensmaker's formula.

If this focal length ratio $|f_1/f_2|$ falls below the lower limit, the second lens can become too weak to correct coma aberrations, forcing the fifth lens L5 to have strong aspheric surface coefficients. More importantly, the second lens L2 can become too weak to reduce the overall lateral chromatic aberration of the lens system. If the focal length ratio rises above the upper limit, the first lens L1 can become too weak. The diameter of the first lens L1 grows, requiring more material and increasing the size and weight of the lens system. Also, when the ratio goes above the upper limit, the meniscus bending of the third lens L3 can become extreme, making that lens more difficult to manufacture.

The first lens group G1 preferably should have a focal length which makes it easy to bend the rays onto the sensor without incurring too many aberrations. The ratio of the focal length $f_{G1}$ of the first lens group to the maximum image height $h_m$ preferably falls in the range $$0.8 \leq \left|\frac{f_{G1}}{h_m}\right| \leq 2.1 \tag{3A}$$

or more preferably $$0.9 \leq \left|\frac{f_{G1}}{h_m}\right| \leq 1.9. \tag{3B}$$

Note that for a rectangular image plane (such as for a sensor array), the maximum image height $h_m$ is half the diagonal distance across the sensor (i.e., the distance from the center of the sensor array to a corner of the sensor array). If this ratio exceeds the upper limit, the diameter of the first element L1 can become too large. This forces the third lens L3 to be strongly curved. These conditions make the lenses difficult to fabricate. Furthermore, the distortion and lateral chromatic aberrations become difficult to correct. If the ratio falls below the lower limit, the lens system suffers from increased axial chromatic aberration. Also, the first lens group can become too strong, causing the illumination falloff to become severe.

The ratio of the focal length $f_{G1}$ of the first lens group to the effective focal length f of the overall system defines the relative strength of the first and second lens groups. The ratio preferably falls in the range $$2.0 \le \left| \frac{f_{G1}}{f} \right| \le 4.0. \qquad (4A)$$

or more preferably $$2.5 \le \left| \frac{f_{G1}}{f} \right| \le 3.5. \qquad (4B)$$

If this ratio exceeds the upper limit, the power of the first lens group can become too weak. The diameter of the first lens L1 can become too large, and the bending on the third lens can become too strong, making the lens difficult and expensive to manufacture. Also, the curvature of the fifth lens L5 can become too strong, increasing the likelihood of coma aberration and sensitivity to manufacturing errors. If this ratio falls below the lower limit, the first lens group G1 can become too strong. The distortion and lateral chromatic aberrations increase as well as the illumination falloff. Furthermore, the axial chromatic aberration usually increases beyond what is restorable with linear image processing.

The second lens group G2 has three positively powered lenses. The third lens L3 typically has a low Abbe number to counter the lateral chromatic and distortion aberrations. The fifth lens L5 and, in some cases, the fourth lens L4 have aspheric surfaces. To manufacture lenses with such aspheric surfaces, either special glass types which can be compression molded or polymer material which can be injection molded are preferred. In this design, the third lens L3 is a meniscus type lens with the convex surface facing the image side. The ratio of the focal length $f_3$ of the third lens to the focal length $f_{45}$ of the fourth and fifth lenses together preferably fall in the range $$4.0 \le \left| \frac{f_3}{f_{45}} \right| \le 50. \qquad (5A)$$

or more preferably $$6.0 \le \left| \frac{f_3}{f_{45}} \right| \le 30. \qquad (5B)$$

If this ratio falls below the lower limit, the third lens can become too strong, increasing the axial chromatic aberration. When the focal length ratio exceeds the upper limit, the third lens can become of little use to the system as it has negligible power. The third lens can also become strongly bent, making it difficult to manufacture.

More important is the ratio of the powers of the fourth and fifth lenses. The focal length ratio of the fourth lens $f_4$ to the fifth lens $f_5$ preferably falls in the range $$1.6 \le \left| \frac{f_4}{f_5} \right| \le 40. \qquad (6A)$$

or more preferably $$1.9 \le \left| \frac{f_4}{f_5} \right| \le 20. \qquad (6B)$$

If this focal length ratio falls below the lower limit, the fourth lens L4 can become too strong and the spherical aberration increases beyond the point where linear image processing can recover the lost contrast. If the focal length ratio exceeds the upper limit, then the axial chromatic aberration increases. Also, the diameter of the first lens L1 grows.

Finally, one advantage of this family of designs is the ability to produce high quality images for a system with a short total track length. The short total track length is achieved due to the ability to balance optical aberrations against the capabilities of the digital sensing and processing subsystems. The total lens length $\Sigma d$ is the physical distance along the optical axis from the object-facing surface of the first lens (L1 in this case) to the image-facing surface of the last lens (L5). The ratio of the total lens length to the focal length of the system preferably falls in the range $$8 \le \frac{\sum d}{f} \le 22. \qquad (7A)$$

or more preferably $$9 \le \frac{\sum d}{f} \le 18 \qquad (7B)$$

or even more preferably $$10 \le \frac{\sum d}{f} \le 13 \qquad (7C)$$

If this ratio falls below the lower limit, then the distortion and the lateral chromatic aberrations can become too severe. Also, the spherical and coma aberrations can become too strong due to the extreme bending of the lenses. Also, the illumination begins to fall off. If the ratio exceeds the upper limit, then the lens system can become too large to correct the axial chromatic aberration and the astigmatism without the use of cemented lenses. Also, the lens system becomes too long to be useful as the ratio increases too much.

An especially important feature for certain applications is the ratio of the total track length TTL to the maximum image height $h_m$. Since most sensor systems operate better (and may even require) a small chief ray angle of incidence, this ratio defines the utility of the design. In this family of designs, the ratio of the total track length to the maximum image height preferably falls in the range $$7.0 \le \frac{TTL}{h_m} \le 10. \quad (8)$$

If the lens system has a ratio below the lower limit, the illumination falloff and optical distortion can become too severe. The lateral chromatic aberration increases considerably as well. The fourth lens can become too thin with high powered surfaces making the lens difficult to manufacture. If the lens system has a ratio above the upper limit, the system can become too long for certain applications. Also, the first and second lenses can have strong surface powers, making the system more expensive to manufacture.

Table 2 shows the various ratios defined above, for the specific design described in Table 1.

TABLE 2

Ratios for the Example Five-Lens Design

| Ratio | value |
|---|---|
| $f_1/f_2$ | 2.45 |
| $f_{G1}/h_m$ | 1.26 |
| $f_{G1}/f$ | 2.69 |
| $f_4/f_5$ | 2.50 |
| $f_3/f_{45}$ | 7.96 |
| $\Sigma d/f$ | 16.13 |
| $TTL/h_m$ | 8.82 |

The ranges given in Eqns. 2-8 above were for the specific system requirements described in the previous section: total track length less than 16 mm, 190 degree field-of-view, F/2.8 lens, maximum field height of 1.71 mm, 1/7 inch VGA resolution image sensor having 4.25 μm pixels, three-color operation over 425-700 nm, and standard Bayer pattern for the color filters.

Example Two Design

Figure 9:
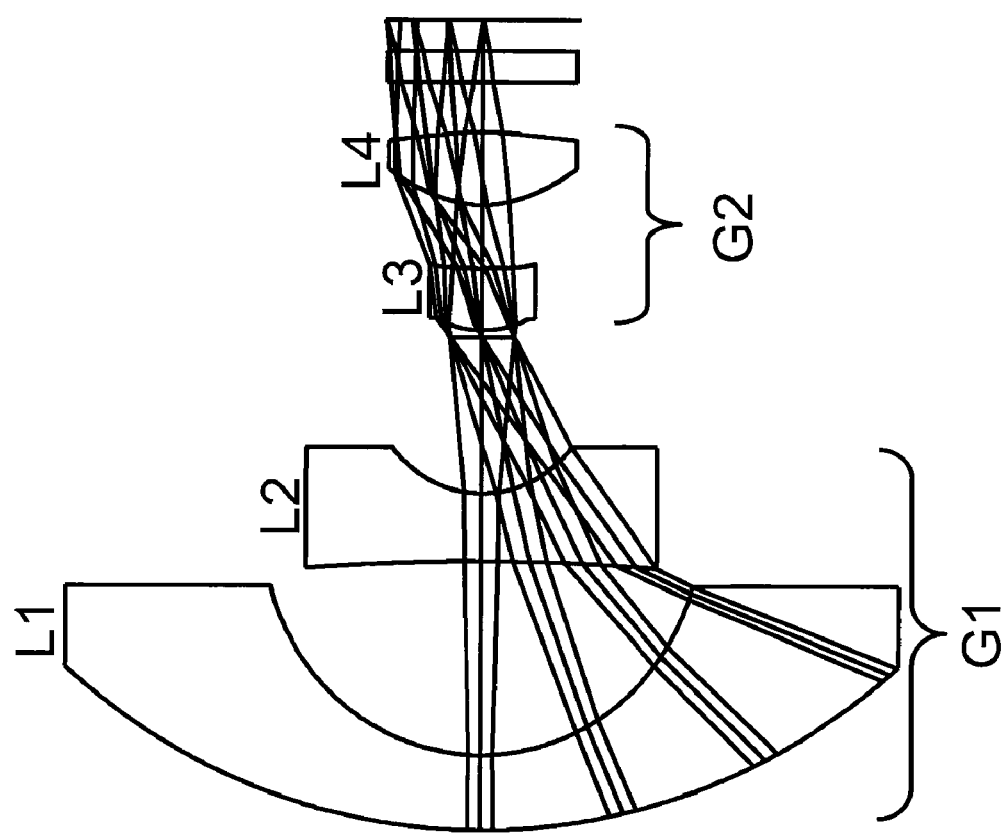
FIG. 9 shows a compact four-lens optical system according to the invention.

FIG. 9 shows a compact four-lens optical system according to the invention. The lens design has a focal length of f=1.12 mm with a 190 degree field-of-view. The lens is an F/2.6 lens with a maximum field height of 1.71 mm corresponding to a 1/7 inch VGA resolution image sensor having 4.25 μm pixels. The system is designed for three-color operation over the spectral range of 425-700 nm, using a standard Bayer pattern for the color filters.

The optical prescription for the lens design is shown in Table 3. This design is a more extreme version of the axial and lateral chromatic aberration relaxation described in the previous example. The lens system includes a first negatively powered lens group G1 and a second positively powered lens group G2. The third and fourth lenses are aspheric elements. The aspheric terms are defined by the conic constant k, the rotationally symmetric higher order even polynomial terms and some non-rotationally symmetric polynomial terms. The aspheric surface is defined by the surface sag S(x, y) including functions of the radial distance $\rho=\sqrt{x^2+y^2}$. The surface sag is defined by $$S(x, y) = \frac{\frac{\rho^2}{R}}{1 + \sqrt{1 - (1+k)\frac{\rho^2}{R^2}}} + c_3(x^3 + y^3) + c_4 \rho^4 + c_5 \rho^4 + c_5(x^5 + y^5) + c_6 \rho^6 + c_8 \rho^8 \quad (9)$$

where R is the radius of curvature of the surface. Table 3 also lists the values for the aspheric terms.

TABLE 3

Example Four-Lens Design

| Surface | Radius (mm) | Thickness (mm) | Nd | Vd |
|---|---|---|---|---|
| 1 | 10.670 | 1.2 | 1.59 | 61.3 |
| 2 | 3.688 | 3.11 | | |
| 3 | −36.249 | 1.08 | 1.44 | 94.1 |
| 4 | 1.870 | 2.55 | | |
| 5 (stop) | inf | 0.1 | | |
| 6 | 1.699 | .996 | 1.53 | 56.0 |
| 7 | 10.122 | 1.02 | | |
| 8 | 2.001 | 1.16 | 1.49 | 84.5 |
| 9 | −4.527 | 0.80 | | |
| 10 | inf | 0.5 | 1.52 | 64.2 |
| 11 | inf | 0.5 | | |

TABLE 3-continued

Example Four-Lens Design

| Surface | Conic (k) | $c_3$ | $c_4$ | $c_5$ | $c_6$ | $c_8$ |
|---|---|---|---|---|---|---|
| 6 | | 8.35E−3 | 5.75E−3 | −4.87E−4 | | |
| 7 | | | | | −5.47E−2 | 1.13E−1 |
| 8 | −2.09 | | | | 2.13E−3 | −1.14E−4 |
| 9 | −80.3 | | | | | |

The maximum lateral color separation between the 500 and 580 nm wavelengths at full field is 12.0 μm. The color separation between 425 and 500 nm is 19 μm. The color separation between 580 and 700 nm is 12.0 μm. These chromatic separations fall just outside the optimal range for the pixel size. However, this range is acceptable because the image processing can fix the lateral chromatic effects at at the edge of the field in this range.

Figure 10:
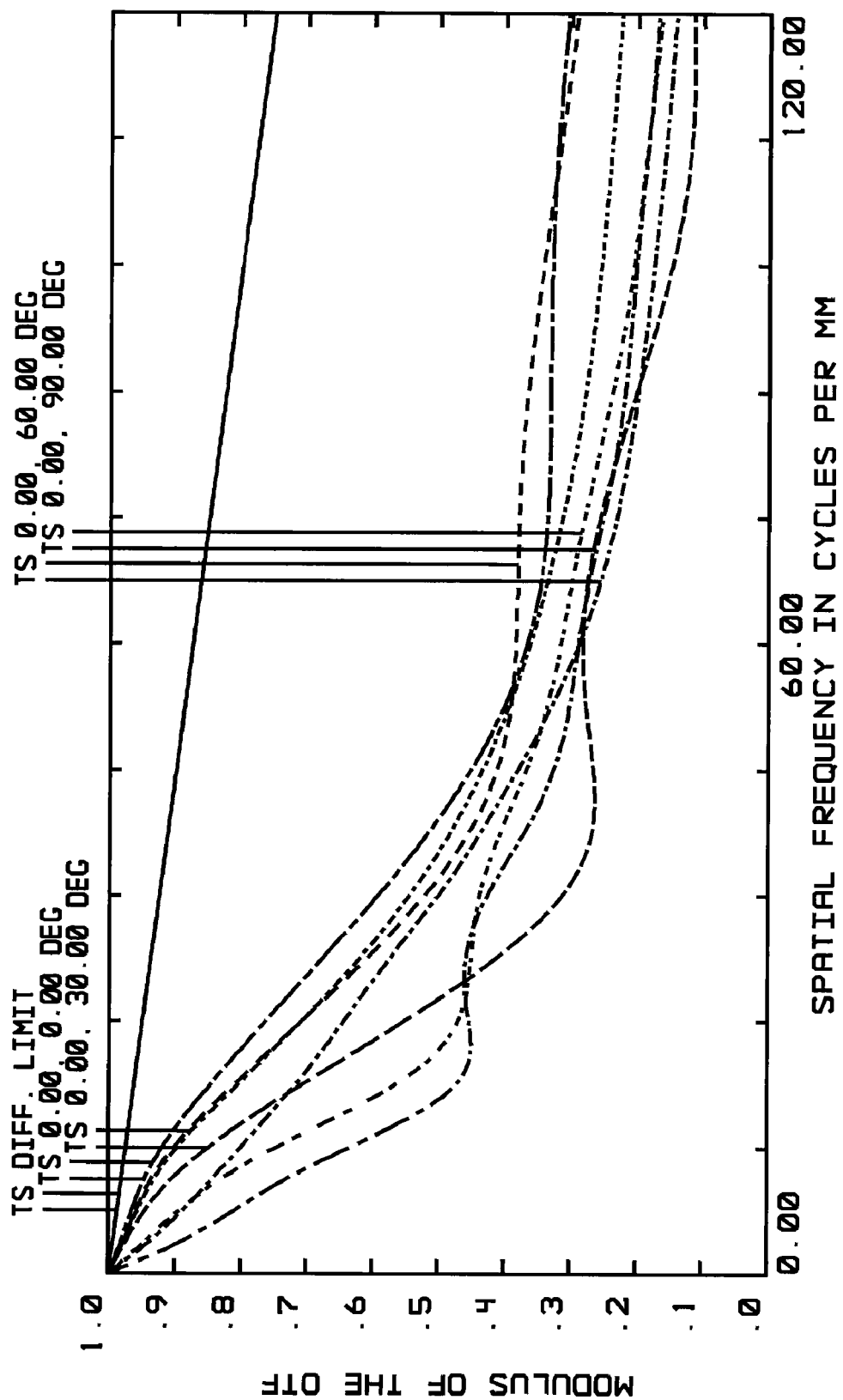
FIGS. 10-12 are MTF curves at 486, 587 and 656 nm wavelengths for the optical system of FIG. 9.
Figure 11:
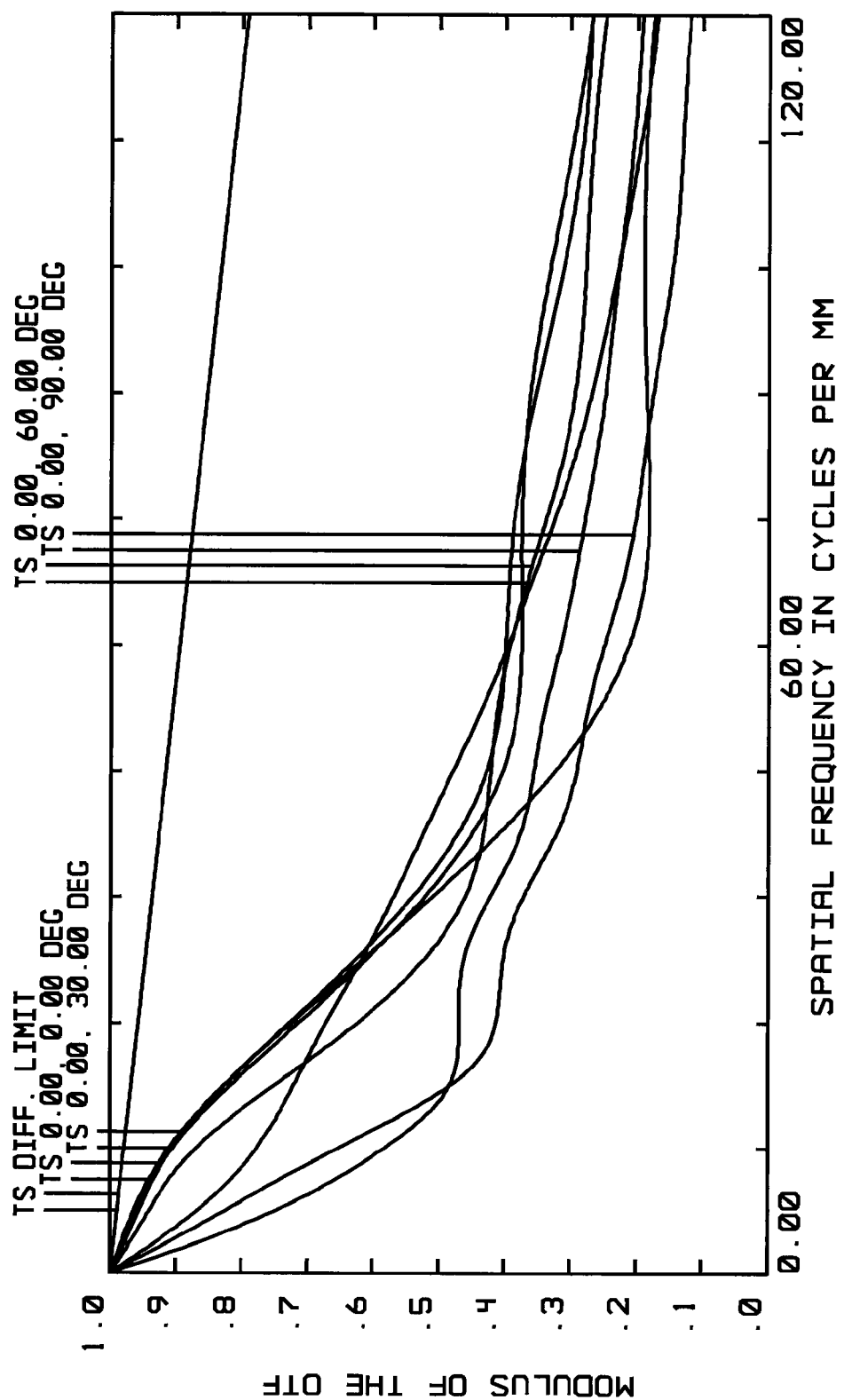
Figure 12:
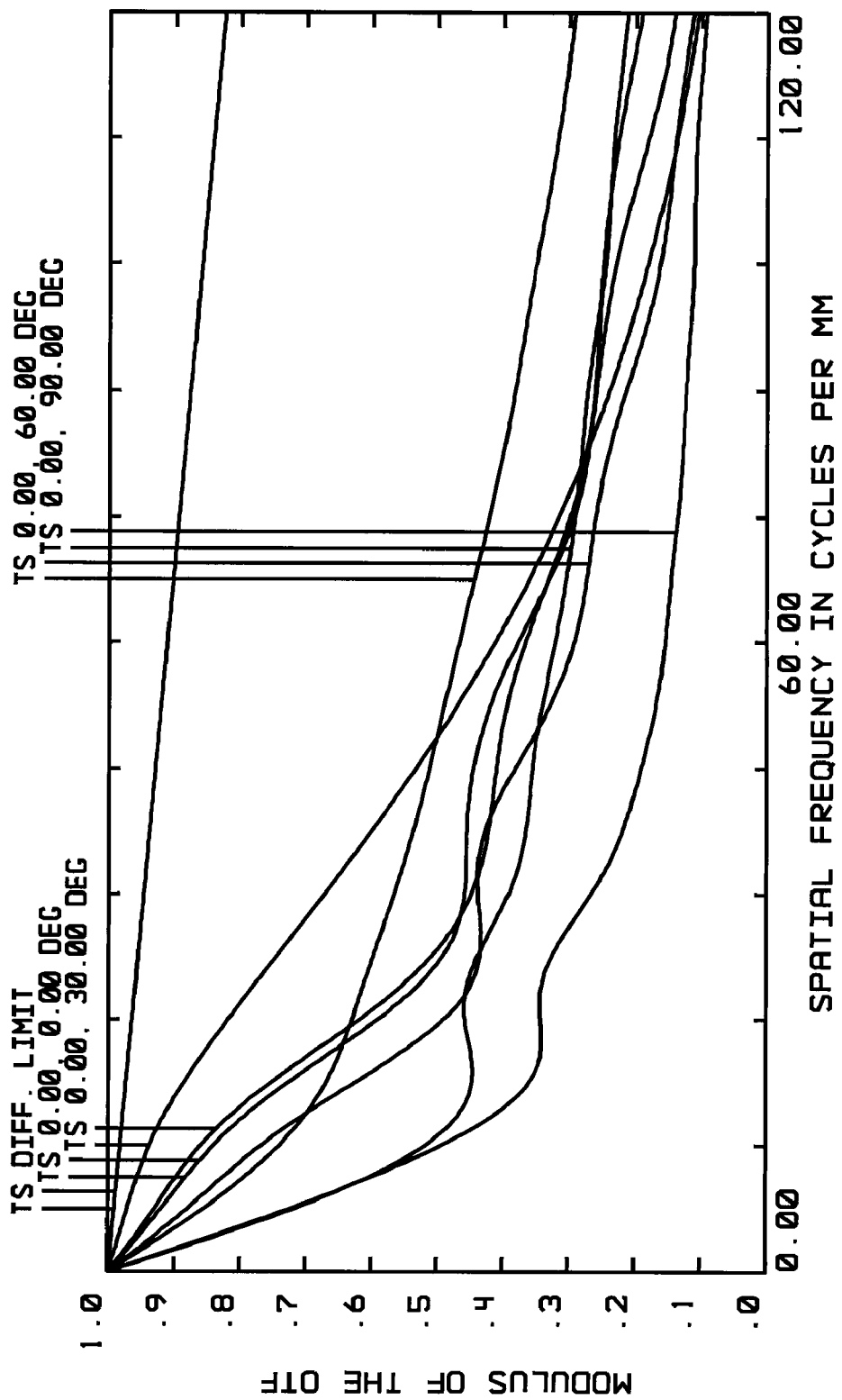

FIGS. 10-12 show the MTF curves for the wavelengths 486, 587, and 656 nm, respectively. The MTF curves are labelled the same as in FIGS. 4-6: "T" for the MTF in the tangential plane and "S" for the MTF in the sagittal plane, where the field angle is given by the number of degrees. As with the MTF curves in FIGS. 4-6, the MTF curves in FIGS. 10-12 are not diffraction-limited. However, they generally do not fall below 10 percent contrast at the effective sampling rate for each color channel and there are no zero crossings. The performance is in the range that can be restored via digital sharpening.

Figure 13:
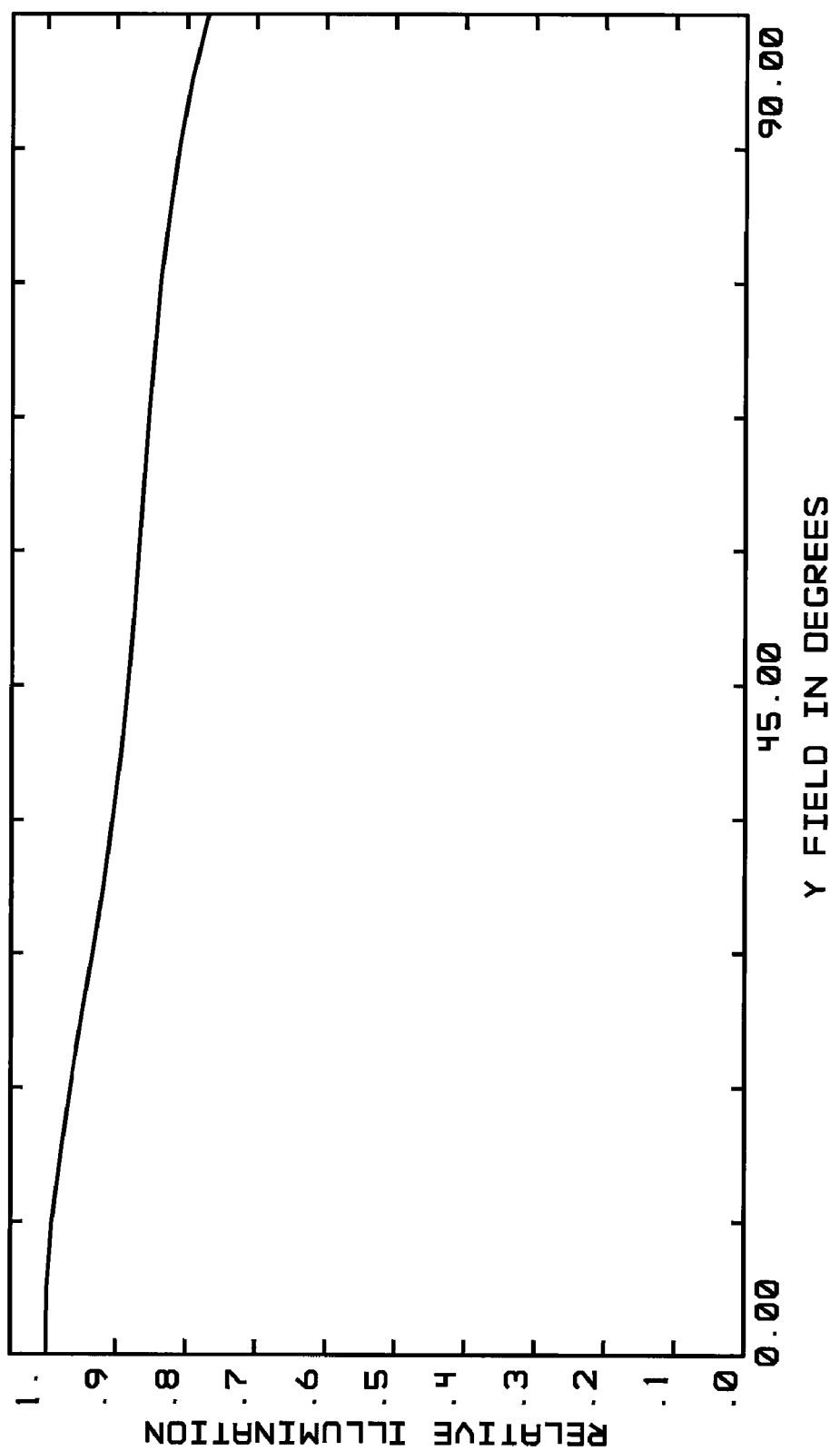
FIG. 13 is a graph of relative illumination over the field of view for the optical system of FIG. 9.

FIG. 13 shows the relative illumination over the field of view, including polarization effects. The lens provides fairly constant illumination over the field of view, which is good for vehicular applications.

Example Two Family

The optical system described in FIGS. 9-13 is but one of a family of designs based on similar principles. More generally, lens systems of this sort can be constructed from not more than four lenses without any cemented lens elements. The lens system has two lens groups. The first lens group (G1 in FIG. 9) is a negatively powered lens group. It bends the wide field angles into smaller field angles. The second lens group G2 is the positively powered lens group which acts to focus the light flux onto the photodetector array while balancing the optical aberrations.

The first lens group G1 requires only two negatively powered lenses. The first lens L1 is a meniscus type lens having a convex surface facing the object. The second lens L2 is a negatively powered lens with a concave image-facing surface. The object-facing surface can be either concave or convex. The first lens L1 acts primarily to redirect the wide field angles towards the aperture stop. The second lens L2 imparts a negative astigmatism aberration to counter the positive astigmatism added by the last element of the second lens group.

The ratio of the focal length $f_1$ of the first lens to the focal length $f_2$ of the second lens preferably falls in the range $$1.5 \le \left|\frac{f_1}{f_2}\right| \le 4.0 \quad (10A)$$

or more preferably $$1.5 \le \left|\frac{f_1}{f_2}\right| \le 2.2 \quad (10B)$$

If the focal length ratio falls below the lower limit, the second lens L2 can become too weak to correct coma aberrations, forcing the fourth lens L4 to have strong aspheric surface coefficients. More importantly, the second lens can become too weak to reduce the overall lateral chromatic aberration of the lens system. If the focal length ratio exceeds the upper limit, the first lens L1 can become too weak. The diameter of the first lens grows, requiring more glass material increasing the size and weight of the lens system. Also, the overall lens system suffers from illumination falloff.

The first lens group G1 preferably has a focal length which makes it easy to bend the rays onto the sensor without incurring too many aberrations. The ratio of the focal length of the first lens group $f_{G1}$ to the maximum image height $h_m$ preferably falls in the range $$0.8 \le \left|\frac{f_{G1}}{h_m}\right| \le 2.5. \quad (11A)$$

or more preferably $$0.9 \le \left|\frac{f_{G1}}{h_m}\right| \le 2.0. \quad (11B)$$

If the focal length ratio exceeds the upper limit, the diameter of the first lens L1 can become too large. This forces the second lens L2 and fourth lens L4 to become too thin. These conditions make the lenses difficult to fabricate. Furthermore, the illumination falloff can become severe. The distortion and lateral chromatic aberrations become difficult to correct. If the focal length ratio falls below the lower limit, the lens system suffers too much illumination falloff. The first and second lenses can become too strong and, therefore, too difficult to manufacture and assemble.

The ratio of the focal length $f_{G1}$ of the first lens group to the effective focal length f of the system defines the relative strength of the first and second lens groups. The ratio preferably falls in the range $$1.2 \le \left|\frac{f_{G1}}{f}\right| \le 5.0. \quad (12)$$

If this focal length ratio exceeds the upper limit, the power of the first lens group can become too weak. The diameter of the second and the third lenses can become too small, making them expensive to manufacture. The fourth lens can become too thin, with an overly strong first surface power. If the ratio falls below the lower limit, the first lens group can become too strong and thick. The lateral chromatic aberration increases considerably.

The second lens group G2 has two positively powered lenses. The third lens L3 and, in some cases, the fourth lens L4 will have aspheric surfaces. The ratio of the focal length $f_3$ of the third lens to the focal length $f_4$ of the fourth lens preferably falls in the range $$0.55 \leq \left|\frac{f_3}{f_4}\right| \leq 2.7. \quad (13A)$$

or more preferably $$0.75 \leq \left|\frac{f_3}{f_4}\right| \leq 2.4. \quad (13B)$$

If the ratio falls below the lower limit, the third lens can become too strong, making the lens overly thick. Also, the edge thickness of the fourth lens can become too thin, making both lenses difficult to manufacture. The air spacing between the two lenses shrinks, making the lens difficult to assemble. When the ratio exceeds the upper limit, the third lens can become too weak and highly curved. Also, the first lens can become too large and the total lens length increases. The steep angles of incidence on the fourth lens can make the whole system difficult to manufacture and assemble.

The ratio of the total lens length $\Sigma d$ to the focal length of the system preferably falls in the range $$6.0 \leq \frac{\sum d}{f} \leq 20. \quad (14A)$$

or more preferablyi $$8.0 \leq \frac{\sum d}{f} \leq 14. \quad (14B)$$

Below this range, the distortion and the lateral chromatic aberrations can become too severe. Also, the surface power on the first surface of L4 can become too strong. Above this range, the lens system can become too large to correct the axial and lateral chromatic aberrations without the use of cemented lens elements. This also causes a drop in MTF.

As with the previous example, one advantage of this family is the ability to produce high quality images (after image processing), utilizing only a short total track length The ratio of the total track length TTL to the maximum image height preferably falls in the range $$5.9 \leq \frac{TTL}{h_m} \leq 9.5. \quad (15)$$

Below the lower limit, the illumination falloff and optical distortion can become too severe. Also, the lens system requires highly powered surfaces for lenses L3 and L4, making the system difficult to manufacture. The lateral chromatic aberration increases as well. Above the upper limit, the illumination falls off as well. The axial chromatic aberration increases such that significant image processing is required to restore image contrast. Also, the first and second lenses have strong surface powers, making the system more expensive to manufacture. The lens can also become too long for many applications.

Table 4 shows the various ratios defined above, for the specific design described in Table 3.

TABLE 4

Ratios for Example Four-Lens Design

| ratio | value |
|---|---|
| $f_1/f_2$ | 2.53 |
| $f_{G1}/h_m$ | 1.38 |
| $f_{G1}/f$ | 2.06 |
| $f_3/f_4$ | 1.12 |
| $\Sigma d/f$ | 11.38 |
| $TTL/h_m$ | 7.2 |

The ranges given above were for the specific system requirements described above.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. An imaging system comprising:
    an image-forming lens system consisting of, in order from object to image:
        a first negatively powered lens group consisting of two negatively powered non-cemented lenses L1 and L2; and
        a second positively powered lens group consisting of three positively powered non-cemented lenses L3, L4 and L5, wherein the lenses are positioned in the order L1, L2, L3, L4, L5 from the object to the image;
        the first and second lens groups acting in concert to image a field of view of at least 180 degrees onto an image plane; and
    a sensor array located at a focal plane of the lens system, the sensor array operating in three color bands wherein, at a central wavelength of each color band and for every field angle within the field of view, a modulation transfer function of the lens system does not fall below approximately 10% of the diffraction limited modulation transfer function for spatial frequencies below a pixel sampling rate for the color band.

2. The imaging system of claim 1 wherein the image plane has an image height $h_m$ and the lens system has a total track length of not more than $10h_m$.

3. The imaging system of claim 1 wherein lens L5 is an aspheric lens.

4. The imaging system of claim 3 wherein lenses L1-L4 are spherical lenses.

5. The imaging system of claim 3 wherein either lens L3 or L4 is an aspheric lens.

6. The imaging system of claim 1 wherein a ratio of a focal length $f_1$ of the lens L1 to a focal length $f_2$ of the lens L2 falls in the range:

$$1.2 \le \left|\frac{f_1}{f_2}\right| \le 3.8.$$

7. The imaging system of claim 1 wherein a ratio of a focal length $f_{G1}$ of the first lens group to the maximum image height $h_m$ falls in the range:

$$0.9 \le \left|\frac{f_{G1}}{h_m}\right| \le 1.9.$$

8. The imaging system of claim 1 wherein a ratio of a focal length $f_{G1}$ of the first lens group to an effective focal length f of the lens system falls in the range:

$$2.0 \le \left|\frac{f_{G1}}{f}\right| \le 4.0.$$

9. The imaging system of claim 1 wherein a ratio of a focal length $f_3$ of the lens L3 to an effective focal length $f_{45}$ of the lenses L4 and L5 together falls in the range:

$$4.0 \le \left|\frac{f_3}{f_{45}}\right| \le 50.$$

10. The imaging system of claim 1 wherein a ratio of a focal length $f_4$ of the lens L4 to a focal length $f_5$ of the lens L5 falls in the range:

$$1.6 \le \left|\frac{f_4}{f_5}\right| \le 40.$$

11. The imaging system of claim 1 wherein a ratio of a total lens length $\Sigma d$ of the lens system to an effective focal length f of the lens system falls in the range $$10 \le \frac{\Sigma d}{f} \le 22.$$

12. The imaging system of claim 1 further comprising:
digital processing communicatively coupled to the sensor array, for digitally filtering the images captured by the sensor array.

13. An image-forming lens system consisting of, in order from object to image:
a first negatively powered lens group consisting of two negatively powered non-cemented lenses L1 and L2, wherein a ratio of a focal length $f_1$ of the lens L1 to a focal length $f_2$ of the lens L2 falls in the range $$1.5 \le \left|\frac{f_1}{f_2}\right| \le 2.2;\text{ and}$$

a second positively powered lens group consisting of three positively powered non-cemented lenses L3, L4 and L5, wherein the lenses are positioned in the order L1, L2, L3, L4, L5 from the object to the image;
the first and second lens groups acting in concert to image a field of view of at least 180 degrees onto an image plane.

14. An imaging system comprising:
an image-forming lens system consisting of, in order from object to image:
a first negatively powered lens group consisting of two negatively powered non-cemented lenses L1 and L2; and
a second positively powered lens group consisting of three positively powered non-cemented lenses L3, L4 and L5, wherein the lenses are positioned in the order L1, L2, L3, L4, L5 from the object to the image;
the first and second lens groups acting in concert to image a field of view of at least 180 degrees onto an image plane; and
a sensor array located at a focal plane of the lens system, the sensor array operating in three color bands wherein, for each color band, for all wavelengths in that color band and for every field angle within the field of view, a modulation transfer function of the optical system does not cross zero at any spatial frequency below a pixel sampling rate for the color band.

15. An imaging system comprising:
an image-forming lens system consisting of, in order from object to image:
a first negatively powered lens group consisting of two negatively powered lenses L1 and L2; and
a second positively powered lens group consisting of two positively powered lenses L3 and L4, wherein the lenses are positioned in the order L1, L2, L3, L4 from the object to the image; and
a sensor array located at a focal plane of the lens system, the sensor array operating in three color bands wherein, at a central wavelength of each color band and for every field angle within the field of view, a modulation transfer function of the lens system does not fall below approximately 10% of the diffraction limited modulation transfer function for spatial frequencies below a pixel sampling rate for the color band.

16. The imaging system of claim 15 wherein lens L4 is an aspheric lens.

17. The imaging system of claim 15 wherein lenses L1-L3 are spherical lenses.

18. The imaging system of claim 15 wherein lens L3 is an aspheric lens.

19. The imaging system of claim 15 wherein a ratio of a focal length $f_3$ of the lens L3 to a focal length $f_4$ of the lens L4 falls in the range:

$$0.55 \le \left|\frac{f_3}{f_4}\right| \le 2.7.$$

20. The imaging system of claim 15 wherein a ratio of a total lens length Σd of the lens system to an effective focal length f of the lens system falls in the range $$8.0 \le \frac{\Sigma d}{f} \le 20.$$

21. The imaging system of claim 15 further comprising:
    digital processing communicatively coupled to the sensor array, for digitally filtering the images captured by the sensor array.
22. An image-forming lens system consisting of, in order from object to image:
    a first negatively powered lens group consisting of two negatively powered lenses L1 and L2, wherein a ratio of a focal length $f_1$ of the lens L1 to a focal length $f_2$ of the lens L2 falls in the range $$1.5 \le \left|\frac{f_1}{f_2}\right| \le 4.0; \text{ and}$$

a second positively powered lens group consisting of two positively powered lenses L3 and L4, wherein the lenses are positioned in the order L1, L2, L3, L4 from the object to the image.
23. An image-forming lens system consisting of, in order from object to image:
    a first negatively powered lens group consisting of two negatively powered lenses L1 and L2, wherein a ratio of a focal length $f_1$ of the lens L1 to a focal length $f_2$ of the lens L2 falls in the range $$1.5 \le \left|\frac{f_1}{f_2}\right| \le 2.2; \text{ and}$$

a second positively powered lens group consisting of two positively powered lenses L3 and L4, wherein the lenses are positioned in the order L1, L2, L3, L4 from the object to the image.
24. An imaging system comprising:
    an image-forming lens system consisting of, in order from object to image:
        a first negatively powered lens group consisting of two negatively powered lenses L1 and L2; and
        a second positively powered lens group consisting of two positively powered lenses L3 and L4, wherein the lenses are positioned in the order L1, L2, L3, L4 from the object to the image; and
    a sensor array located at a focal plane of the lens system, the sensor array operating in three color bands wherein, for each color band, for all wavelengths in that color band and for every field angle within the field of view, a modulation transfer function of the optical system does not cross zero at any spatial frequency below a pixel sampling rate for the color band.

\* \* \* \* \*